United States Patent [19]

Hammerle

[11] Patent Number: 5,486,758
[45] Date of Patent: Jan. 23, 1996

[54] INTEGRAL VARIABLE RELUCTANCE SPEED SENSOR

[75] Inventor: Mark K. Hammerle, Fenton, Mich.

[73] Assignee: Kelsey-Hayes Company, Romulus, Mich.

[21] Appl. No.: 374,401

[22] Filed: Jan. 17, 1995

Related U.S. Application Data

[63] Continuation of Ser. No. 132,737, Oct. 6, 1993, abandoned.
[51] Int. Cl.$^6$ ..................................................... G01P 3/48
[52] U.S. Cl. ........................ 324/174; 324/173; 324/207.15
[58] Field of Search .................................. 324/174, 173, 324/207.15

[56] References Cited

U.S. PATENT DOCUMENTS

| | | |
|---|---|---|
| 3,719,841 | 3/1973 | Ritsema . |
| 4,045,738 | 8/1977 | Buzzell . |
| 4,652,818 | 3/1987 | Buchschmid et al. . |
| 4,829,245 | 5/1989 | Echasseriau et al. . |
| 5,032,790 | 7/1991 | Johnson . |
| 5,039,942 | 8/1991 | Buchschmid et al. ................ 324/174 |
| 5,080,500 | 1/1992 | Hilby et al. . |
| 5,123,755 | 6/1992 | Faye et al. . |

OTHER PUBLICATIONS

D. Gilchrist, Kelsey Hayes Engineering Drawing—Assembly/Bobbin/Molded, Jul. 3, 1992, p. SU 12729500.

*Primary Examiner*—Kenneth A. Wieder
*Assistant Examiner*—Kourosh Cyrus Khosravi
*Attorney, Agent, or Firm*—MacMillan, Sobanski & Todd

[57] ABSTRACT

A variable reluctance magnetic transducer including a tubular housing having a closed end and an open end. A bracket is attached to the outside of the housing a predetermined distance form the closed end of the housing. A core supporting a ferrous metal pole piece and a permanent magnet is disposed within the housing with an end of the pole piece contacting the inside of the closed end of the housing to accurately position the pole piece end relative to the bracket. The core supports a pair of fork terminals which engage arcuate blade terminals carried by a cap assembly. The blade terminals allow positioning of the cap assembly at a plurality of angles relative to the core and housing.

33 Claims, 7 Drawing Sheets

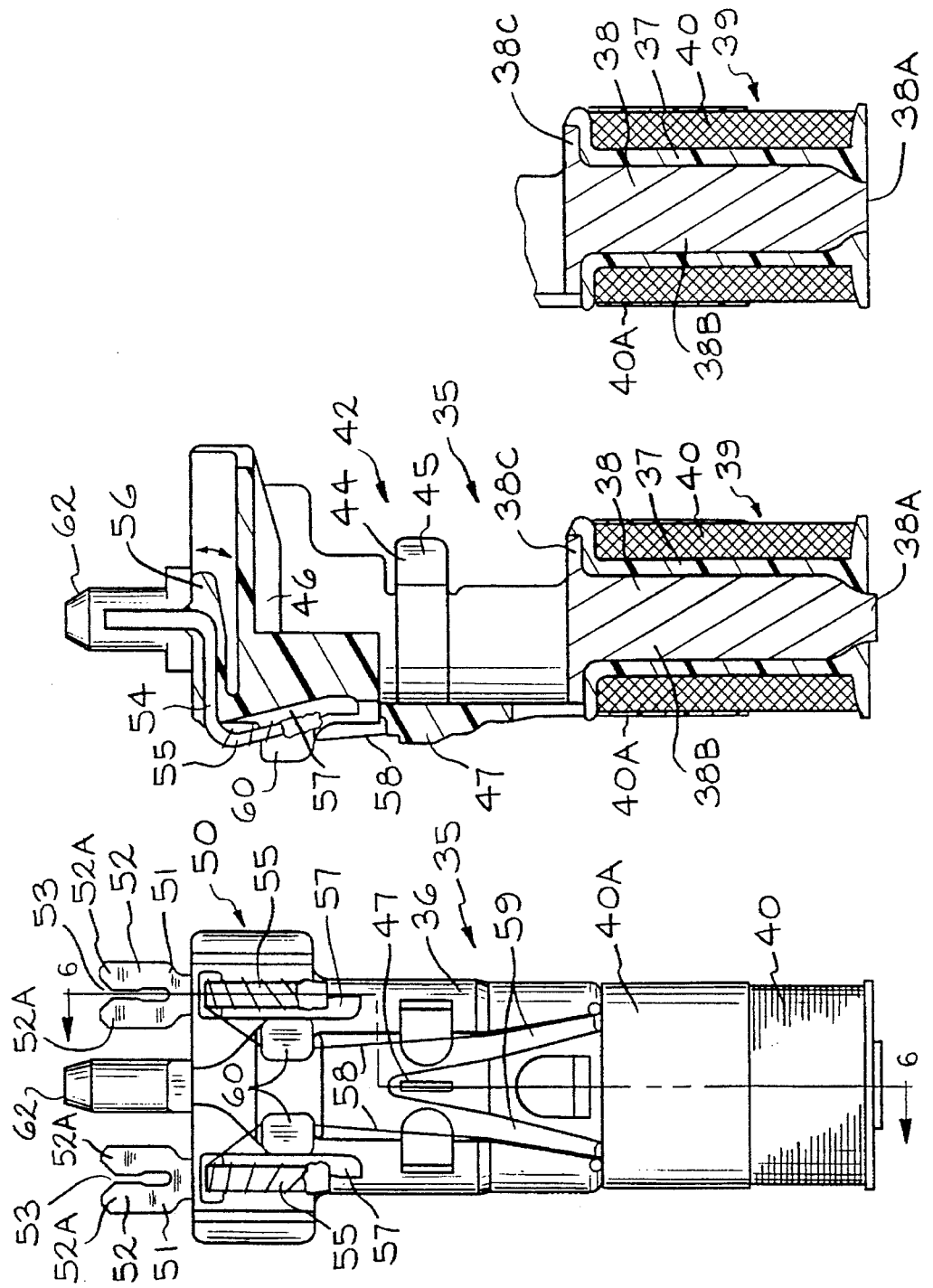

INTEGRAL VARIABLE RELUCTANCE SPEED SENSOR

This application is a continuation of application No. 08/132,737 filed on Oct. 6, 1993 now abandoned.

BACKGROUND OF THE INVENTION

The present invention relates generally to variable reluctance magnetic transducers and, in particular, to a passive-type magnetic transducer especially suited for sensing the speed of a rotating object.

Passive-type variable reluctance magnetic transducers are well known and have been widely used as speed sensors in electric control circuits for monitoring the speed of an associated rotating object such as, for example, a gear, a wheel or a bearing. Typically, the transducer includes a permanent magnet which is adjacent to one end of a pole piece formed from a ferrous material. An opposite end of the pole piece extends outwardly from the transducer to define a pole piece free end. The pole piece free end is adapted to be spaced from projecting ferrous elements attached to a rotating object, such as the teeth of a rotating gear. A coil surrounds the pole piece for sensing changes in magnetic flux through the coil. The coil is connected to generate an output signal to an associated electronic control circuit. An example of a prior art passive-type magnetic speed sensor can be found in U.S. Pat. No. 5,032,790.

In operation, a magnetic field extends from the magnet through the pole piece and out into the air space at the free end of the pole piece. The return path of the magnetic field is from the air space to the other end of the magnet. As a ferrous element approaches the tip of the pole piece, the reluctance of the magnetic circuit decreases, thus increasing the magnetic field. As the ferrous object passes away from the pole piece, the magnetic field decreases. When the magnetic field increases, it induces a voltage in the coil in one direction and, when it decreases, it induces a voltage in the coil in the opposite direction. The passage of one ferrous object (such as one gear tooth) induces one cycle of AC voltage. The AC voltage is proportional to the rate of change of magnetic flux in the magnetic circuit, and is generally proportional to the speed of the ferrous objects passing the pole piece, at least up to a predetermined speed. The frequency of the AC signal is directly proportional to the number of ferrous objects passing the pole piece per unit of time.

When a variable reluctance magnetic sensor is used, it is important to accurately fix the position of the face of the free end of the pole piece with respect to the trajectory of the periphery of the projecting ferrous element. In practice, it has been observed that an axial shift of the end of the pole piece by a few tenths of a millimeter in the direction of increasing the spacing separating the pole piece from the ferrous element can lead to a loss of useful signal.

According to the prior art, variable reluctance magnetic transducers are typical formed by inserting the permanent magnet and pole piece into a cylindrical cavity formed in a transducer core. The transducer core is usually molded from plastic material. As an alternative, the magnet and pole piece are placed in an end-to-end relationship and the core molded thereover. The alternate method allows use of a non-cylindrical pole piece. With both methods, the accuracy of the position of the free end of the pole piece with respect to the rotating ferrous object depends upon the cumulative tolerances of the length of the magnet and the length of the pole piece.

SUMMARY OF THE INVENTION

This invention relates to a variable reluctance magnetic transducer having the position of the face of the free end of the pole piece accurately fixed relative to an associated rotating object.

The transducer includes a pole piece having first and second ends formed from a ferrous metal. The transducer also includes a core having a first end portion formed about the pole piece with the first end of the pole piece projecting axially from the first end portion and thereby defining a pole piece free end. A coil is wound axially about the exterior of the first end portion. The core also has an intermediate portion formed adjacent to the first end portion. The intermediate portion has a chamber formed therein with the second end of the pole piece forming one end of the chamber. The chamber includes an opening formed through the side of the intermediate portion, the opening being adapted to receive a permanent magnet. The permanent magnet is retained in the chamber by a pair of arms extending from the sides of the opening. A tab formed on the end of the chamber opposite from the pole piece and projecting axially into the chamber urges the magnet into contact with the second end of the pole piece. The core further has a second end portion formed adjacent to the intermediate portion and opposite from the first end portion. The second end portion of the core supports a pair of fork terminal connectors which are electrically connected to the coil.

The core is disposed within a tubular housing having a closed first end and an open second end, with the closed first end forming an inside surface. The first end of the pole piece contacts the inside surface of the closed housing end. The second end, of the core also is contained within the housing. The housing exterior surface includes an annular recess formed therein that receives an O-ring. When the transducer is inserted into a mounting opening, the O-ring forms a seal between the wall of the opening and the housing. A bracket is secured to the housing a predetermined distance from the closed end thereof. The bracket has an aperture formed therethrough which is adapted to receive a fastener.

The transducer further includes a cap having an end portion which extends into the open second end of the housing and contacts the second end portion of the core. The cap has an annular recess formed in the exterior surface of the end portion. The recess receives an O-ring which forms a seal between the cap and the inner surface of the housing.

The cap also includes a pair of arcuate shaped blade terminals which engage the fork terminals supported by the core to form an electrical connection between the core and the cap. The blade terminals are electrically connected to a pair of lead wires contained in a connecting cable which is molded to the cap. The cable connects the transducer to an associated electronic control circuit.

The cap further has at least one tab formed on the surface thereof which extends radially outwardly therefrom. The open end of the housing is crimped about the cap and the tab, with the tab preventing rotation of the cap relative to the housing.

Spacing between the pole piece free end and the associated rotating object can be precisely controlled by the axial position of the bracket upon the housing. This allows a substantial reduction in the size of the sensor. Furthermore, the arcuate shape of the blade terminals allows assembly of the transducer with the connecting cable oriented at a plurality of angles with respect to the pole piece.

Various objects and advantages of this invention will become apparent to those skilled in the art from the following detailed description of the preferred embodiment, when read in light of the accompanying drawings.

BRIEF DESCRIPTION OF THE DRAWINGS

FIG. 5 is a left elevational view of a coil assembly used in the transducer shown in FIG. 1.

FIG. 6 is a sectional view taken along line 6—6 of FIG. 5.

FIG. 7 is a partial sectional view of the end of an alternate embodiment of the coil assembly shown in FIG. 5.

DETAILED DESCRIPTION OF THE PREFERRED EMBODIMENT

Figure 1:
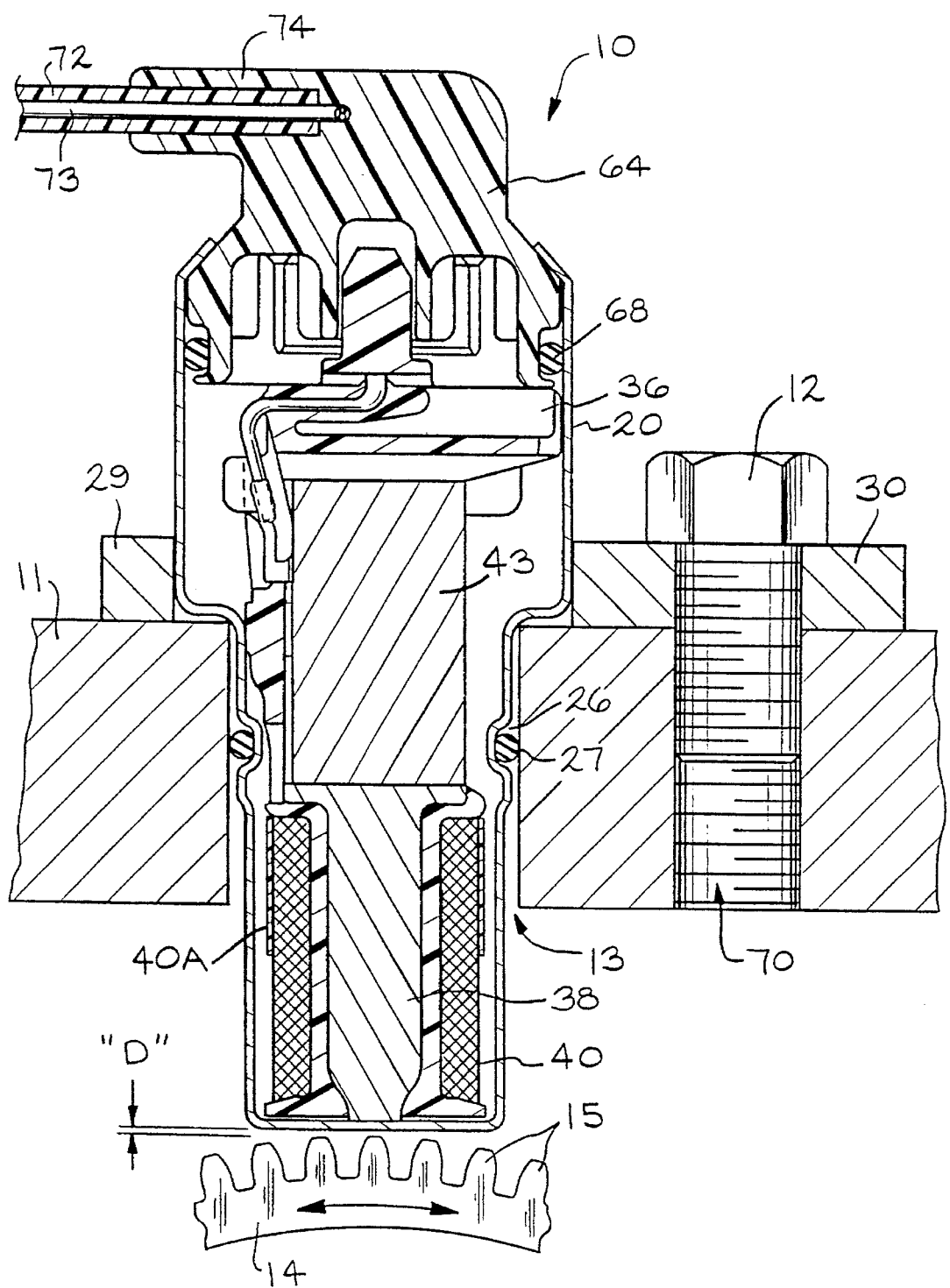
FIG. 1 is a sectional view of a variable reluctance magnetic transducer in accordance with the present invention.

Referring now to the drawings, there is shown in FIG. 1 a variable reluctance magnetic transducer 10 which is secured to a housing 11 for a bearing assembly (not shown) by a bolt 12. As an alternative, the transducer 10 can be secured to a stationary outer bearing race. The transducer 10 is adapted to be inserted into a cooperating bore 13 formed through the bearing housing 11. Accordingly, the transducer components are described in the following as having inner and outer ends relative to the bore 13.

The inner end of the transducer 10 extends through the bore 13 and is positioned in close proximity to a separate exciter ring 14 formed of a ferrous material. The exciter ring 14 is mounted upon a rotatable inner bearing race (not shown) and is secured for rotation therewith. The exciter ring 14 is provided with a plurality of circumferentially spaced apart projecting teeth 15 about the periphery thereof. As described above, rotation of the exciter ring 14 induces a fluctuating voltage within the transducer 10 which is proportional to the rotational speed of the exciter ring 14. It will be appreciated that, while the magnetic transducer 10 is described in the following as a speed sensor for use in monitoring the speed of a bearing race, the transducer can be used in other speed sensing applications, such as measuring the rotational speed of a vehicle wheel, or in other applications where it is desired to sense movement of a ferrous object.

Figure 2:
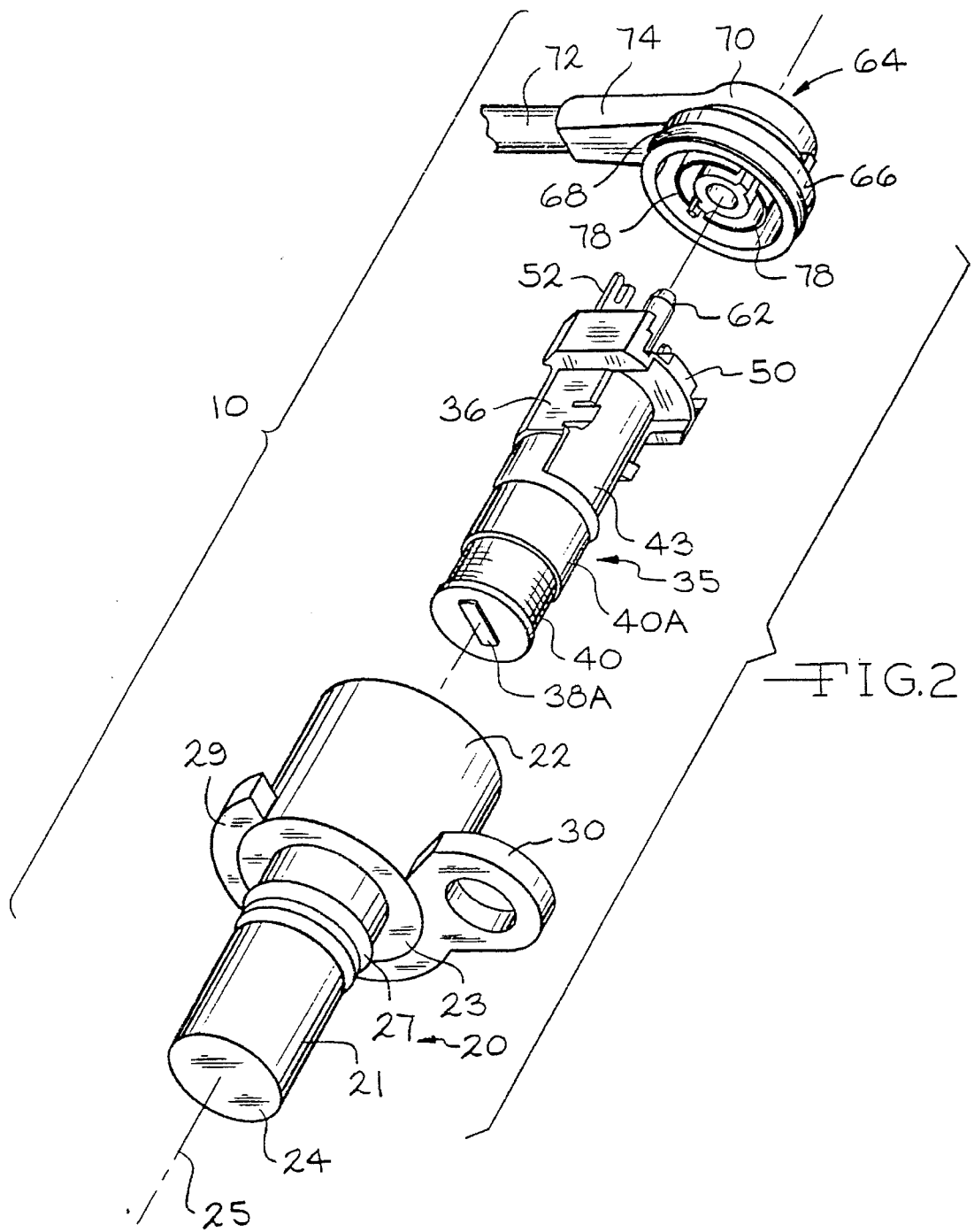
FIG. 2 is an exploded perspective view of the transducer shown in FIG. 1.
Figure 3:
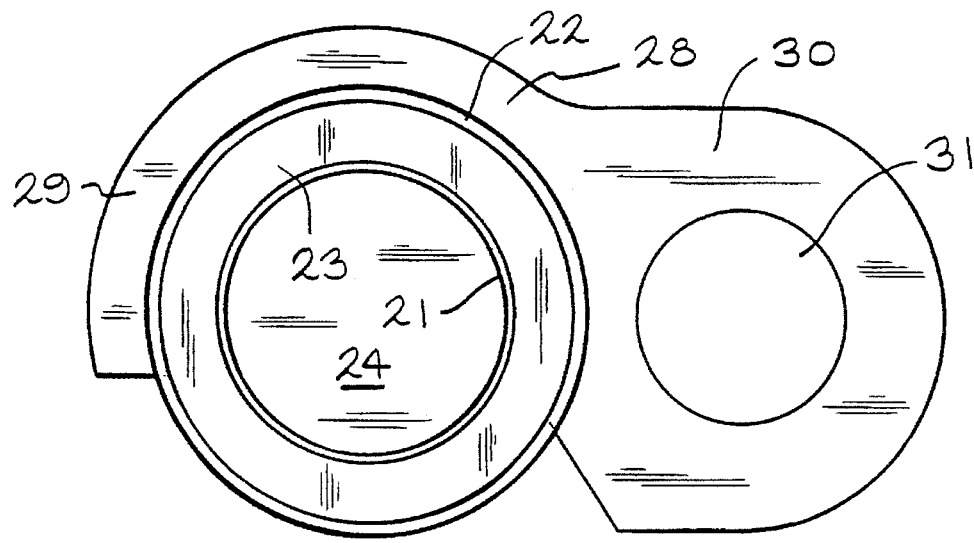
FIG. 3 is a top plan view of a housing for the transducer shown in FIG. 1.
Figure 4:
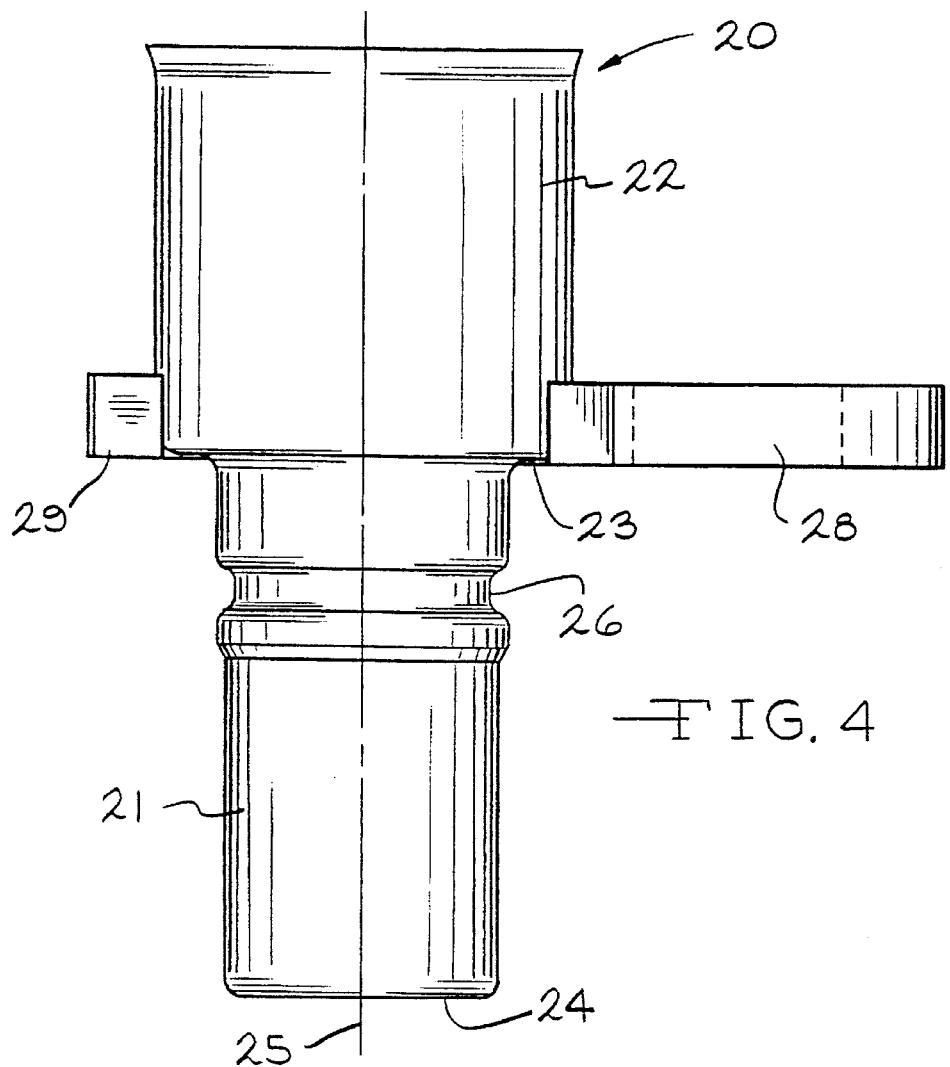
FIG. 4 is a front elevational view of the housing shown in FIG. 3.

As shown in the exploded perspective view of FIG. 2, the transducer 10 includes a cylindrical housing 20 which is more fully illustrated in FIGS. 3 and 4. The housing 20 is formed as a single piece by conventional methods, such as drawing or machining, from a ferrous metal, such as stainless steel. As shown in FIG. 4, the transducer housing 20 includes an inner portion 21 having a closed inner end and an outer portion 22 having an open outer end. The outer portion 22 has a larger diameter than the inner portion 21 and defines a shoulder 23 therebetween. The closed end of the inner portion 21 defines a planar end surface 24 which is generally perpendicular to a longitudinal axis 25 of the transducer 10. The inner portion 21 has an annular recess 26 formed therein perpendicular to the axis 25. The recess 26 receives an external O-ring 27. In the preferred embodiment of the transducer 10, the O-ring 27 is formed from a material having a high-temperature resistance, such as fluorocarbon, which is available under the commercial name of VITON. Such material is rated for temperatures up to 225° C.

A retaining bracket 28 having a generally C-shaped portion 29 is attached to the outer portion 22 of the housing 20 by conventional means, such as brazing or welding. The retaining bracket 28 also includes a tab portion 30 extending therefrom perpendicular to the longitudinal axis 25. A mounting aperture 31 formed through the tab portion 30 receives a fastener, such as the mounting bolt 12 described above.

While the bracket 28 is illustrated as being attached to the housing 20 adjacent to the shoulder 23, it will be appreciated that the bracket 28 can be attached to the housing 20 at other axial positions. As shown in FIG. 1, the planar surface 24 is positioned in close proximity to the tips of the teeth 15 formed upon the exciter ring 14. As will be described below, the axial position of the bracket 28 upon the housing 20 is selected to control the spacing between the end surface 24 of the transducer 10 and the exciter ring 14.

As illustrated in FIG. 2, the transducer housing 20 receives a coil assembly 35 which is inserted through the open end of the outer portion 22 of the transducer housing 20. As best seen in FIGS. 5 through 8, the coil assembly 35 includes a core 36 which is molded from a plastic material, such as Polybutyleneterephthalate (PBT) reinforced with glass fibers. The core 36 includes an inner portion 37 which is molded over a ferrous pole piece 38.

As best seen in FIG. 6, the pole piece 38 has an inner tip 38A shaped to correspond to the exciter ring teeth 15. For example, as illustrated, the tip 38A has a rectangular cross-sectional shape. In the preferred embodiment, the tip 38A extends axially outwardly from the core inner portion 37, and thereby defines a free end of the pole piece. It will be appreciated that the tip 38A also can be formed flush with the end of the core, as shown in the partial view of FIG. 7 where the tip 38A extends through the core inner portion 37 but not beyond the end thereof. The pole piece 38 further includes a cylindrical intermediate portion 38B land an cylindrical outer portion 38C having a larger diameter than the intermediate portion 38B The criteria for the selection of the diameter for the outer portion 38C of the pole piece 38 will be described below.

The exterior surface of the core inner portion 37 includes an annular recess that defines a bobbin 39 which supports a coil 40 in coaxial relationship with the pole piece 38. In the preferred embodiment, the coil 40 is wound with approximately 6,000 turns of 155° C. or 180° C. solderable 45 American Wire Gage magnet wire. It will be appreciated that other wire sizes and number of turns can be used to wind the coil to produce a different coil characteristic corresponding to a particular application. A piece of non-conducting tape is wound about the outer surface of inner portion of the coil 40 to form a coil sleeve 40A which prevents the wire on the bobbin 39 from unraveling during assembly and operation of the transducer 10. In the preferred embodiment of the transducer 10, the tape is formed from a high temperature resistant material, such as polymide, which is available under the name KAPTON. Such tape is rated for temperatures in excess of 400° F. (200° C.). While the coil sleeve 40A is shown on the outer portion of the coil 40, the tape can also be applied to form the sleeve 40A on other portions of the coil or can cover the entire surface thereof.

The core 36 further includes a generally cylindrical intermediate portion 41 having a cylindrical chamber 41A formed therein. The inner end of the chamber 41A is formed by the end surface of the pole piece 38. The chamber 41A includes a rectangular opening 42 formed through a side of the intermediate portion 41. The opening 42 is adapted to allow insertion of a cylindrically shaped magnet 43 into the chamber 41A. The magnet 43 is formed from an available permanent magnetic material, such as iron, cobalt, nickel alloys, of the type sold under the trade designation "ALNICO". Different alloys can be used for the magnet to produce transducers 10 having different operating characteristics. As will be described below, the magnet can be inserted into the core 36 as the final step of fabricating the coil assembly 35. This means that transducers having various characteristics can be manufactured using a common core 36. The magnet 43 is included in FIGS. 1 and 2, but has been omitted from FIGS. 5 through 7 in order to illustrate other features of the core intermediate portion 41.

A pair of retaining arms 44 extend tangentially outward from the sides of the opening 42. Each arm 44 includes a wedge shaped inner portion 45 that clamps over the magnet 43 to retain the magnet 43 within the opening 42. The retaining arms 44 are sized to have an interference fit with the inside surface of the housing 20. Upon insertion of the core assembly 35 into the transducer housing 20, the retaining arms 44 are urged against the magnet 43 by the housing surface. This urging presses the magnet 43 fully into the chamber 41A and into axial alignment with the pole piece outer portion 38C.

A pair of interior ribs 46 extend axially inward from the outer end of the chamber 41A to urge the magnet 43 axially against the end of the pole piece 38. The thickness of the ribs 46 is selected to allow partial crushing of the ribs 46 upon insertion of the magnet 43, thereby compensating for axial tolerances in the length of the magnet 43. It will be appreciated that while two ribs 46 are shown in the preferred embodiment, a single, centrally located, rib (not shown) could also be used. The diameter of the pole piece outer portion 38C is selected to be approximately the same as the diameter of the magnet 43 to assure establishment of a strong magnetic field. As best seen in FIG. 6, an axially extending positioning rib 47 projects radially from the exterior surface of the core intermediate portion 41. As will be described below, the positioning rib 47 co-operates with the retaining arms 44 to center and retain the coil assembly 35 within the housing 20.

The core 36 also includes an outer portion 50 that supports a pair of Z-shaped fork terminals 51. Each of the fork terminals 51 includes of a connector portion 52 having a pair of prongs 52A separated by a slot 53. The connector portion 52 is joined by a base portion 54 to an end portion 55. As shown in FIG. 5, the connector portions 52 extend upwardly from the core outer portion 50 parallel to the axis of the core 36. As best seen in FIG. 6, the base portions 54 extend horizontally across the core outer portion 50 and the end portions 55 extend downwardly along the side of the core 36. As illustrated in FIGS. 6 and 7, the core upper portion 50 includes a pair of cantilevered support arms 56 which are molded over the base portions 54 of the terminals 51. These horizontal arms 56 flex in the axial direction in FIG. 6 to absorb vibrations and cumulative stack-up tolerances of the transducer components. The fork terminal end portions 55 are received by axial recesses 57 formed in the outer surface of the core upper portion 50.

Figure 8:
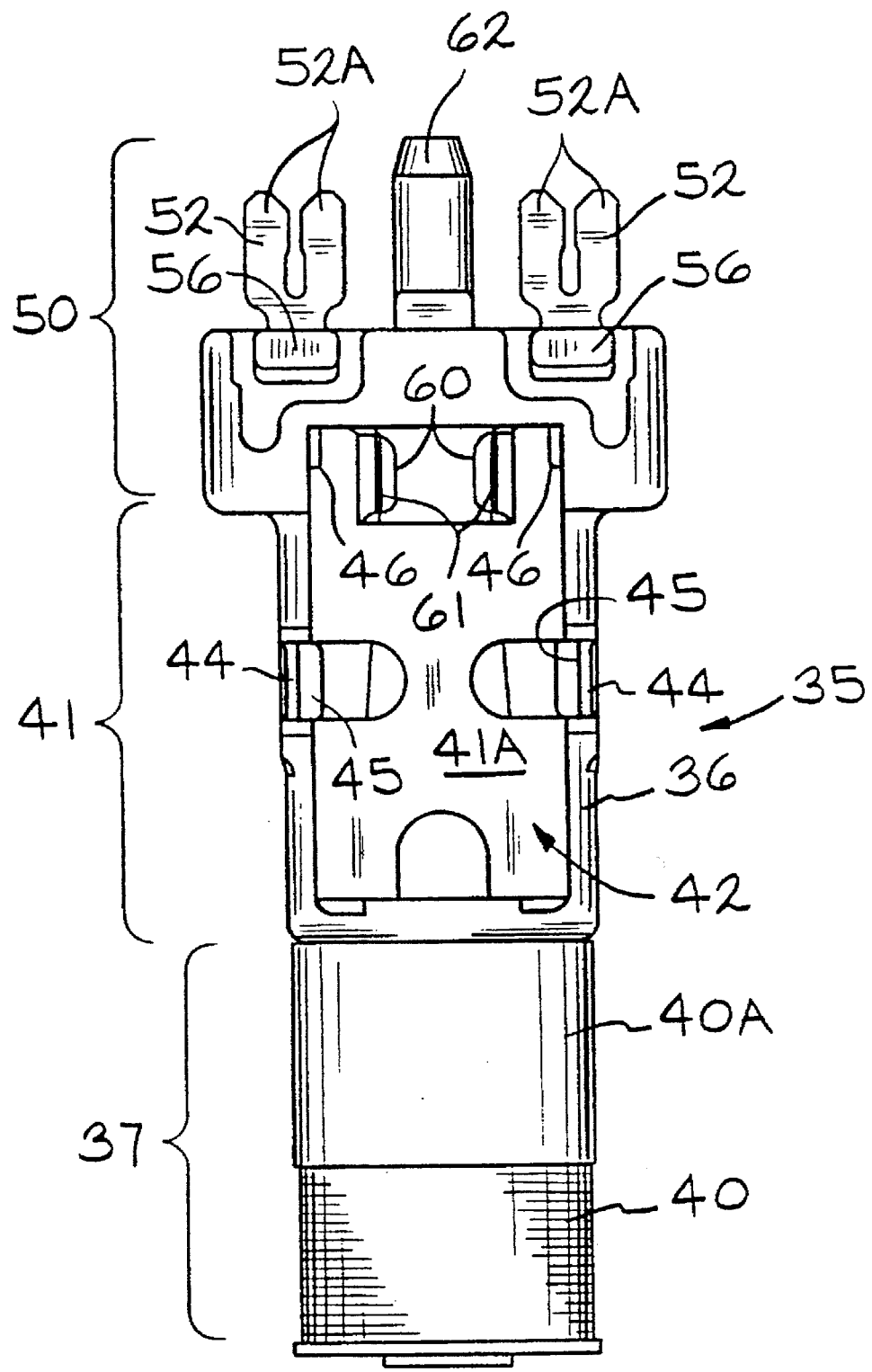
FIG. 8 is a right elevational view of the coil assembly shown in FIG. 5.

A pair of lead wires 58 extend from the coil 40 through recesses 59 formed in the exterior surface of the core intermediate portion 41 to the terminal end portions 55. Each lead wire 58 is wrapped around one of the terminal end portions 55 and secured thereto by a conventional means, such as soldering. A pair of tangential tabs 60 formed on the exterior surface of the outer portion 50 include undercuts 61, as shown in FIG. 8, that receive the lead wires 58, assuring that the wires do not contact the outer housing 20 upon assembly of the transducer 10. A centering pin 62 extends axially upward from the outer portion 50.

Figure 9:
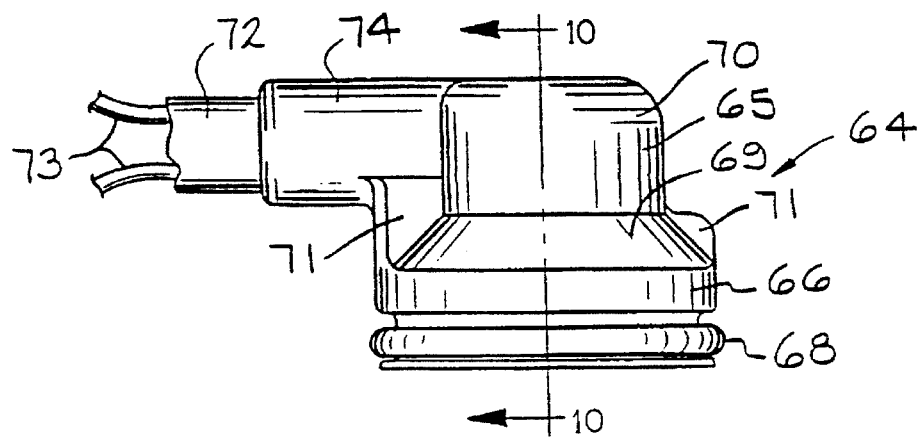
FIG. 9 is a front elevational view of a cap assembly used in the transducer shown in FIG. 1.
Figure 10:
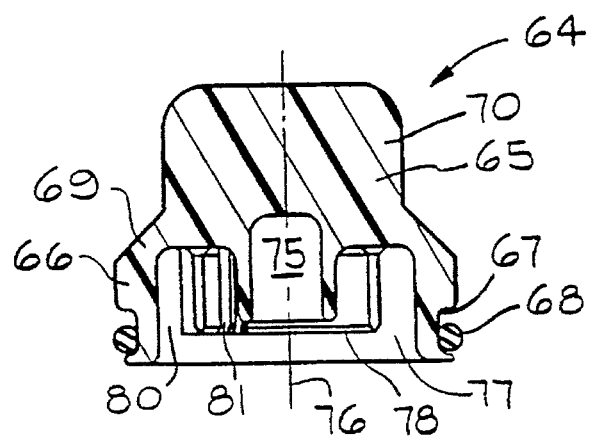
FIG. 10 is a sectional view taken along line 9—9 in FIG. 8.
Figure 11:
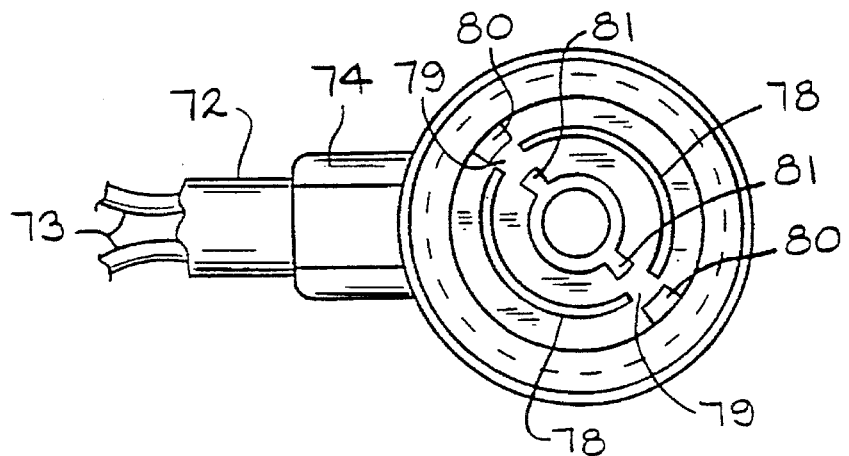
FIG. 11 is a bottom plan view of the cap assembly shown in FIG. 8.

The transducer 10 further includes a cap assembly 64, which is illustrate in FIGS. 9 through 11. The cap assembly 64 has a stepped cylindrical body 65. The body 65 is molded from a plastic material, such as Polyphenylene Sulfide (PPS) reinforced with glass fibers. PPS has excellent high temperature resistance characteristics, retaining its molded shape at temperatures in excess of 500° F. (260° C.) and allowing the transducer 10 to be used in a high temperature environment. The body 65 includes an inner portion 66 which is received by the open outer portion 22 of the housing 20 and has a diameter that approximates the diameter of the core outer portion 50. An annular recess 67 formed in the exterior of the inner portion 66 receives an internal O-ring 68. In the preferred embodiment of the transducer 10, the internal O-ring is formed from a material having a high temperature resistance, such as fluorocarbon, which is available under the commercial name of VITON. Such material is rated for temperatures up to 225° C. The inner portion 66 of the cap body 66 is joined by a conical shaped intermediate portion 69 to a reduced diameter outer portion 70. A pair of external antirotation tabs 71, the use of which will be explained below, extend radially from the intermediate portion 69. A cable 72 including a pair of conductors 73 extends from a sleeve 74 formed in the cap body outer portion 70.

As best seen in FIG. 10, the cap assembly 64 has a cylindrical recess 75 formed therein along a central axis 76. The assembly 64 further includes an annular recess 77 formed therein concentric with the cylindrical recess 75. The annular recess has a pair of arcuate shaped blade terminals 78 secured therein. Each of the blade terminals 78 extends through approximately 160 degrees of arc and is positioned within the annular recess 77 such that the ends of the terminals 78 are separated by approximately 20 degrees of arc. The separations form a pair of air gaps 79 between the blade terminals 78. Each of the blade terminals 78 is electrically connected (not shown) to one of the cable conductors 73. As shown in FIG. 11, a first pair of tabs 80 are formed in the annular recess 77 extending radially inward from the outside wall of the recess. Each tab 80 is located adjacent to one of the air gaps 79. Similarly, a second pair of tabs 81 are formed in the annular recess 77 opposite form the first set of tabs 80 and extending radially outward from the inside wall of the recess. The function of the first and second pairs of tabs 80 and 81 will be described below. It will be appreciated that a radial rib can be formed within the recess 77 extending thereacross and through the air gap 79 as an alternate to each pair of first and second tabs 80 and 81.

The magnetic transducer 10 is assembled by first placing the pole piece 38 and fork terminals 51 in a core mold (not shown). When placed in the mold, the fork terminals 51 have an L-shape with the terminal ends 55 extending linearly from the base portions 54. The core 36 is formed by a conventional means, such as injection-molding, over the pole piece 38 and the fork terminals 51. The coil 40 is wound upon the core bobbin 39 and the coil leads 58 secured to the terminal ends 55. The terminal ends 55 are then bent downwardly into the core vertical recesses 57. Tape is wound about the coil 40 to form the coil sleeve 40A. As a final step, the magnet 43 is inserted through the opening 42 into the chamber 41A to complete the coil assembly 35. The magnet 43 frictionally engages the interior ribs 46 which axially position the magnet 43 within the core 36 and against the pole piece 38. The magnet 43 is retained by the wedge shaped inner portions 45 of the retaining arms 44. As described earlier, the operating characteristics of the transducer 10 can be varied by using magnets formed from different materials.

In a similar manner, the cap assembly 64 is formed by first placing the cable 72 and blade terminals 78 in a mold. Ends of the conductors 73 are electrically connected to the blade terminals 78. The cap body 65 is then molded over the end of the cable 72 and the blade terminals 78 by a conventional method, such as injection molding. The internal O-ring 68 is inserted into the annular recess 67 formed on the exterior of the cap body 65.

The coil assembly 35 is inserted into the open end 22 of the transducer housing 20 and is fully seated therein with the tip 38A of the pole piece 38 contacting the inside surface of the closed end planar surface 24. As shown in FIG. 1, the pole tip 38A is separated from the tips of the exciter ring teeth 15 by a distance "D" with the distance "D" including the thickness of the housing end. The core upper portion 50 is completely received within the upper portion 22 of the housing 20. Thus, the entire core assembly 35 is disposed within the housing 20.

As explained above, the pole piece tip 38A is shaped to correspond to the exciter ring teeth 15 and the housing 20 is held in position in the bearing housing bore 13 by the bracket 28. Thus, the coil assembly 35 is oriented when inserted into the housing 20 such that the pole piece tip 38A will be aligned with the exciter ring teeth 15 when the transducer 10 is installed in the bore 13. As shown in FIG. 1, the vertical positioning rib 47 frictionally engages the inside surface of the housing 20 immediately below the housing shoulder 23. Additionally, each of the magnet retaining arms 44 also frictionally engages the inside surface of the housing 20 immediately below the housing shoulder 23. The vertical positioning rib 47 co-operates with the retaining arms 44 to center the coil assembly 35 within the housing and to retain the coil assembly 35 in the desired position relative to the housing 20.

The cap assembly 64 is inserted into the open ended portion 22 of the housing 20. The centering pin 62 of the outer core portion 50 is received by the cap cylindrical recess 75 and guides the cap assembly 64 into position upon the core assembly 35. The blade terminals 78 are frictionally received within the fork terminal slots 53. Because of the arcuate shape of the blade terminals 78, the cap assembly 65 can be inserted at a plurality of angular positions relative to the coil assembly 35, and thereby the position of the pole piece 38, and the housing 20. The relative angular position of the cap assembly 64 is only limited by the internal tabs 80 and 81 which prevent the fork terminals 51 from bridging the air gaps 79 and thereby shorting the blade terminals 78. Thus, the cable 72 may be installed at any angular position relative to the housing 20 within 320 degrees of arc. This provides great flexibility for accommodating specific transducer cable path requirements. Furthermore, the cable can be positioned without disturbing the orientation of the pole piece tip 38A relative to the exciter ring teeth 15.

The internal O-ring 68 engages the inner wall of the upper housing portion 22 to form a seal between the cap assembly 64 and the housing 20 which prevents contamination of the coil assembly 35. Thus, the entire coil assembly 35 is protected from outside contamination. The upper edge of the housing upper portion 22 is crimped over the conical intermediate portion 69 of the cap body 65 to secure the cap assembly 64 to the transducer 10. The crimped portion of the housing 20 is formed about the anti-rotation tabs 71 of the cap assembly 64 to prevent any rotation of the cap assembly 64 relative to the housing 20.

As shown in FIG. 1, the assembled transducer 10 is inserted into the bore 13 formed through the bearing housing 11. The external O-ring 27 sealingly engages the inner wall of the bore 13 to prevent any leakage into or out of the bearing assembly. As described above, the transducer 10 is secured to the bearing housing 11 by means of a fastener, such as the bolt 12, which extends through the mounting aperture 30 and into a cooperating threaded bore 70 formed through the housing 11.

Because the magnet 43 is inserted into the coil assembly 35 after the core 36 is formed over the pole piece 38, variation in the axial length of the magnet does not affect the position of the pole piece tip 38A relative to the tips of the exciter ring teeth 15. Furthermore, the flexibility of the support arms 56 in the upper portion 50 of the core 36 compensates for variations in the length of the core 36 and the pole piece 38. As explained above, the axial position of the pole piece 38 within the transducer housing 20 is established when the core is fully inserted into the housing 20 with the pole tip 38A contacting the inside surface of the housing end surface 24. Thus, the distance "D" between the pole piece tip 38A and the tips of the exciter ring teeth 15 is determined by the axial position of the housing 20 within the bore 13, which is precisely controlled by the axial position of retaining bracket 28 upon the housing 20. The inventor has found that this precise control of spacing allows a substantial reduction in transducer size. Additionally, the size of the coil assembly 35 is reduced from that of prior art transducer core assemblies because the magnet 43 is not overmolded within the core 36. This allows a further reduction of size of the transducer 10. The use of high temperature resistant materials allows the transducer 10 to be used in a high temperature operating environment, such as an anti-lock brake/traction control system.

Figure 12:
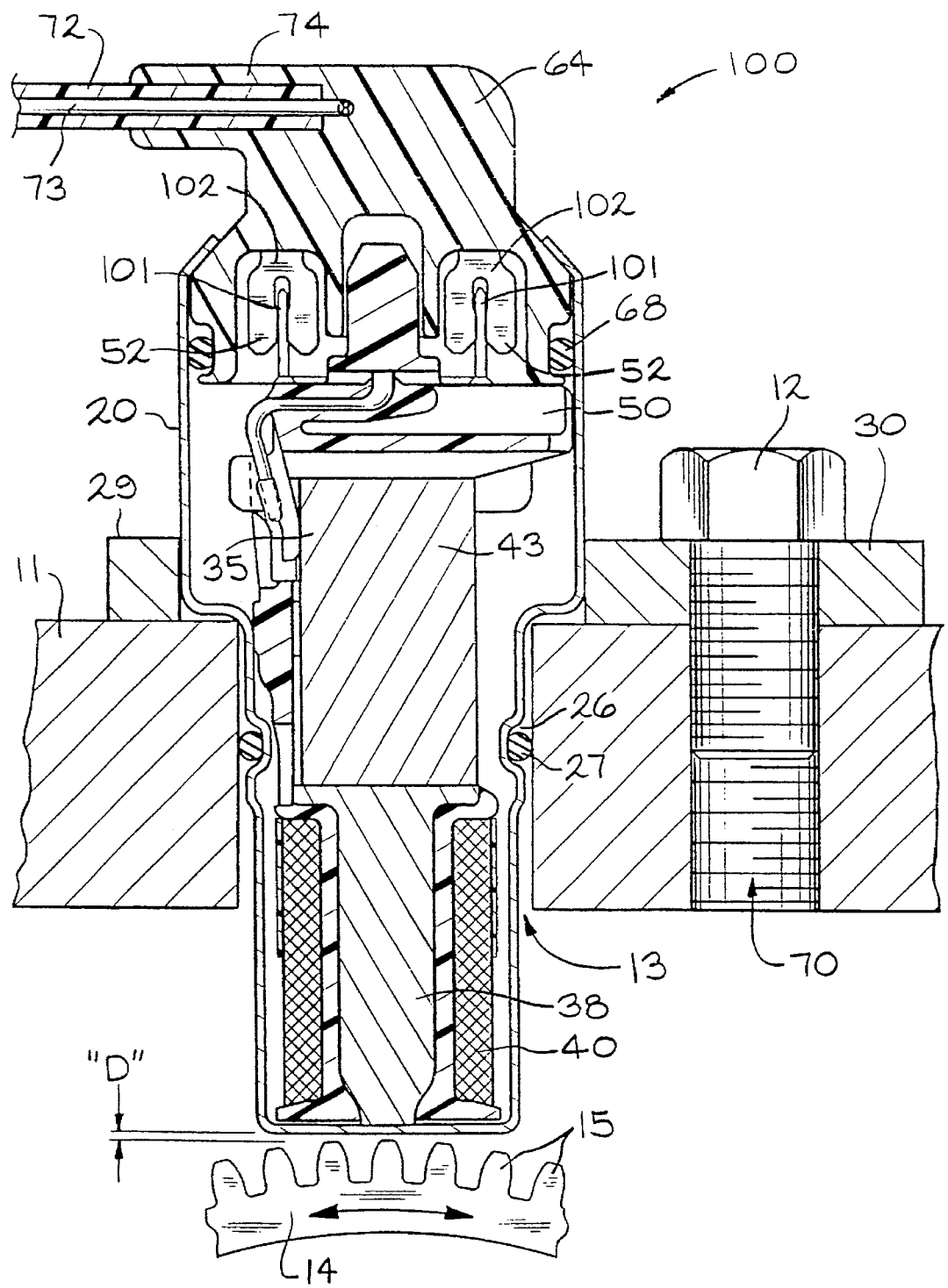
FIG. 12 is a sectional view of an alternate embodiment of the invention.

An alternate embodiment of the transducer 100 is illustrated in FIG. 12. The components included in the alternate embodiment 100 that are similar to the corresponding components in the preferred embodiment 10 are designated by the same identification numerals. In the alternate embodiment 100, a pair arcuate shaped blade terminals 101 are mounted upon the outer portion 50 of the core assembly 35 while a pair of fork terminals 102 are mounted upon the cap assembly 65.

In accordance with the patent statutes, the principle and mode of operation of the invention have been explained and illustrated in its preferred embodiment. However, it must be understood that this invention may be practiced otherwise than as specifically explained and illustrated without departing form its spirit or scope.

What is claimed is:

1. A variable reluctance magnetic transducer comprising:

a pole piece having first and second ends;

a core having a first end portion formed about said pole piece, said pole piece extending through said first end portion, said core also having an intermediate portion adjacent to said first end portion, said intermediate portion including a chamber formed therein, said second end of said pole piece forming one end of said chamber, said chamber including an opening formed through the side of said intermediate portion, said opening adapted to receive a magnet, said intermediate portion also including means for retaining a magnet within said chamber, said core further having a second end portion adjacent to said intermediate portion and opposite from said first end portion;

a permanent magnet retained in said chamber, said magnet having an end contacting said second end of said pole piece;

a pair of electrical connectors supported by said second end portion of said core;

a coil wound about said core first end portion;

means for electrically connecting said coil to said electrical connectors;

a tubular housing having a closed first end and an open second end, said closed first end forming an inside surface, said housing receiving said core with said first end of said pole piece contacting said inside surface of said closed end and said second end of said core being contained within said housing; and a bracket secured to said housing a predetermined distance from said closed end of said housing, said bracket having an aperture formed therethrough, said aperture adapted to receive a fastener.

2. A transducer, as described in claim 1, wherein said first end of said pole piece extends axially from said first end portion of said core.

3. A transducer, as described in claim 1, wherein said intermediate portion of said core includes at least one rib extending axially into said chamber from the end opposite from said pole piece, said rib urging said magnet into contact with said second end of said pole piece.

4. A transducer, as described in claim 1, wherein said means for retaining said magnet includes a pair of tangential retaining arms extending from said core intermediate portion adjacent to said opening, said retaining arms including wedge shaped projections formed on the inner surfaces thereof, said projections clamping onto the surface of said magnet and retaining said magnet in said chamber.

5. A transducer, as described in claim 4, wherein said core further includes an axial rib formed on the exterior thereof and extending radially outwardly therefrom, said axial rib and said retaining arms co-operating to frictionally engage an inside surface of said housing to retain said core therein.

6. A transducer, as described in claim 1, wherein said second end portion of said core includes a pair of arms formed thereon for supporting said electrical connectors, said arms extending generally perpendicular to the axis of said core and being axially flexible.

7. A transducer, as described in claim 1, wherein said means for electrically connecting said coil to said electrical connectors includes a pair of lead wires and said core further includes recesses formed in the exterior surface thereof, said recesses receiving said lead wires.

8. A transducer, as described in claim 1, wherein said housing includes an annular recess, said recess receiving an O-ring.

9. A transducer, as described in claim 1, further including a cap having an end portion, said cap having an annular recess formed in the exterior surface of said end portion, said recess receiving an O-ring, said cap end portion extending into said open second end of said housing and contacting said second end portion of said core with said O-ring forming a seal between said cap and the inner surface of said housing.

10. A transducer, as described in claim 9, wherein said cap includes at least one tab formed on the surface thereof extending radially outwardly therefrom and said open end of said housing is crimped about said cap and said tab, whereby said tab prevents rotation of said cap relative to said housing.

11. A transducer, as described in claim 9, wherein said cap includes a pair of arcuate shaped blade terminals and said electrical connectors supported by said second end portion of said core are fork terminals, said fork terminals engaging said arcuate shaped blade terminals to form an electrical connection therebetween.

12. A transducer, as described in claim 11, wherein said blade terminals have ends separated by air gaps, said cap including at least one tab formed adjacent to said air gaps and extending radially towards said air gaps.

13. A transducer, as described in claim 9, wherein said cap includes a pair of fork terminals and said electrical connectors supported by said second end portion of said core are arcuate shaped blade terminals, said fork terminals engaging said arcuate shaped blade terminals to form an electrical connection therebetween.

14. A method for forming a variable reluctance magnetic transducer comprising the steps of:

(a) providing a core having a first end portion formed about a pole piece having first and second ends, the pole piece extending through the first end portion of the core, the core also having an intermediate portion adjacent to the first end portion, the intermediate portion including a chamber formed therein, the second end of the pole piece forming one end of the chamber, the chamber including an opening formed through the side of the intermediate portion, the opening adapted to receive a magnet, the intermediate portion also including means for retaining a magnet within the chamber, the core further having a second end portion adjacent to the intermediate portion and opposite from the first end portion of the core, the second end portion supporting a first pair of electrical connectors;

(b) winding a coil about the first end portion of the core;

(c) electrically connecting the first pair of electrical connectors to the coil;

(d) inserting a permanent magnet into the chamber formed in the intermediate portion of the core, one end of the magnet contacting the second end of the pole piece;

(e) inserting the core into a tubular housing having a closed end and a bracket attached thereto a predetermined distance from the closed end, the first end of the pole piece contacting the closed housing end and the housing completely receiving the core;

(f) attaching a cap assembly to the core, the cap assembly having an end portion which is received by the housing and a second pair of electrical connectors that engage the first pair of electrical connectors; and (g) securing the housing to the cap assembly.

15. A method for forming a transducer, as described in claim 14, wherein step (g) includes crimping a portion of the housing to the cap assembly.

16. A method for forming a transducer, as described in claim 14, wherein the first end of the pole piece extends axially from the first end portion of the core.

17. A variable reluctance magnetic transducer comprising:

a pole piece;

a core formed about said pole piece, said core including a chamber formed therein having an opening extending through a side of said core, said opening adapted to receive a magnet;

a permanent magnet retained in said chamber; and a tubular housing having an open end and a closed end, said closed end defining an inside surface, said housing receiving said core.

18. A transducer, as described in claim 17, further including a cap secured to said open end of said tubular housing and forming a seal therewith.

19. A transducer, as described in claim 18, wherein said pole piece has an exposed end which contacts said inside surface of said closed end of said housing.

20. A transducer, as described in claim 18, wherein said cap has an annular recess formed in an exterior surface thereof, said recess receiving an 0-ring, said cap being received by said housing with said O-ring forming a seal between said cap and said housing.

21. A transducer, as described in claim 18, wherein said cap is crimped onto said housing.

22. A transducer, as described in claim 18, further including a coil wound around said core, said coil having a lead extending to a fork terminal which projects from said core and further wherein said cap includes an arcuate shaped terminal which is engaged by said fork terminal to form an electrical connection therebetween.

23. A transducer, as described in claim 18, further including a coil wound around said core, said coil having a lead extending to an arcuate shaped terminal which projects from said core and further wherein said cap includes a fork terminal which engages said arcuate shaped terminal to form an electrical connection therebetween.

24. A transducer, as described in claim 18, further including a mounting bracket secured to said housing a predetermined distance from said closed end of said housing.

25. A transducer, as described in claim 24, wherein said bracket has an aperture formed therethrough, said aperture adapted to receive a fastener.

26. A method for forming a variable reluctance magnetic transducer comprising the steps of:

(a) providing a pole piece;

(b) forming a core over the pole piece, the core having a chamber formed therein adjacent to the pole piece, the chamber including opening formed through the side of the core;

(c) inserting a permanent magnet into the core chamber through the side opening; and (d) inserting the core into a tubular housing having a closed end.

27. A method for forming a transducer, as described in claim 26, further including the steps of:

(e) inserting an end portion of a cap assembly into the tubular housing; and (f) securing the housing to the cap assembly.

28. A method for forming a transducer, as described in claim 27, wherein an end of the pole piece is exposed and contacts the inside surface of closed end of the tubular housing.

29. A method for forming a transducer, as described in claim 28, wherein the tubular housing has a bracket attached thereto a predetermined distance from the closed end thereof.

30. A method for forming a transducer, as described in claim 29, wherein the pole piece is adjacent to the chamber.

31. A method for forming a transducer, as described in claim 27, wherein step (f) includes crimping a portion of the housing over the cap assembly.

32. A method for forming a transducer, as described in claim 27, wherein step (b) includes forming the core over a first electrical connector and step (c) includes winding a coil over the portion of the core formed over the core piece, the coil including at least one lead wire which is electrically connected to the first electrical connector, and further wherein the cap includes a second electrical connector which engages the first electrical connector.

33. A method for forming a transducer, as described in claim 32, wherein one of the first and second electrical connectors is an arcuate shaped blade terminal and the other of the first and second electrical connectors is a fork terminal.

* * * * *